United States Patent
Colombo

(10) Patent No.: US 6,825,646 B2
(45) Date of Patent: Nov. 30, 2004

(54) METHOD FOR DETERMINING THE POSITION OF THE ROTOR OF A SYNCHRONOUS ALTERNATING-CURRENT PERMANENT-MAGNET MACHINE

(75) Inventor: Dario Colombo, Milan (IT)

(73) Assignee: ABB Service S.r.l., Milan (IT)

( * ) Notice: Subject to any disclaimer, the term of this patent is extended or adjusted under 35 U.S.C. 154(b) by 26 days.

(21) Appl. No.: 10/329,487

(22) Filed: Dec. 27, 2002

(65) Prior Publication Data

US 2003/0122521 A1 Jul. 3, 2003

(30) Foreign Application Priority Data

Dec. 28, 2001 (IT) ..................................... MI2001A2835

(51) Int. Cl.$^7$ .............................................. H03D 13/00
(52) U.S. Cl. .................................... 324/76.77; 318/437
(58) Field of Search ................................ 318/138, 254, 318/439, 720, 721, 722, 723, 724, 437; 324/207.75, 233, 76.77

(56) References Cited

U.S. PATENT DOCUMENTS

| | | | | |
|---|---|---|---|---|
| 6,388,420 B1 | * | 5/2002 | Jansen et al. | 318/799 |
| 6,462,492 B1 | * | 10/2002 | Sakamoto et al. | 318/254 |
| 6,552,509 B2 | * | 4/2003 | Veltman | 318/807 |
| 6,639,380 B2 | * | 10/2003 | Sul et al. | 318/727 |

* cited by examiner

*Primary Examiner*—Anjan Deb
*Assistant Examiner*—Walter Benson
(74) *Attorney, Agent, or Firm*—Connolly Bove Lodge & Hutz LLP; Larry J. Hume

(57) ABSTRACT

A method for determining a position of a rotor of a synchronous alternating-current permanent-magnet machine includes injecting a high-frequency voltage superimposed on a voltage delivered by a machine control system; measuring a current of the motor and extracting a current corresponding to the injected voltage; and obtaining, from the injected voltage and from the corresponding current, an electrical angle θ suitable to identify the position of the rotor by using a sine and cosine of twice the electrical angle θ of the machine.

2 Claims, No Drawings

METHOD FOR DETERMINING THE POSITION OF THE ROTOR OF A SYNCHRONOUS ALTERNATING-CURRENT PERMANENT-MAGNET MACHINE

FIELD OF THE INVENTION

The present invention relates to electric rotating machines and in particular to a method for determining the position of the rotor of a synchronous alternating-current permanent-magnet machine.

BACKGROUND OF THE INVENTION

As is known, controlling a synchronous alternating-current permanent-magnet machine requires knowing the position of the rotor, which can be determined by means of a suitable sensor installed on the shaft of said machine.

However, when the presence of said sensor is impossible due to cost reasons or other reasons, so-called sensorless algorithms are usually used which, for example by using only current and voltage measurements on the machine, determine the position of the rotor in each instant.

For speeds substantially different from zero, the use of methods based on the counter-electromotive force of the synchronous machine allows good performance, while at speeds close to zero or equal to zero, on isotropic synchronous machines it is not possible to implement so-called sensorless algorithms, since the counter-electromotive force of the motor is nil.

In this case it is possible to use any saturations of the machine, i.e., if the inductance of the machine is a function of the position of the rotor it is possible to use an algorithm of the sensorless type, but in this case it is incorrect to define such a machine as isotropic.

Anisotropic synchronous machines, when supplied by impressed-voltage inverters, due to the variability of the inductance according to the angle of the rotor, impart an information content to the currents of the motor which is independent of rotor speed and allows to deduce the position of the rotor at each instant over time.

However, obtaining information on the position of the rotor from the current of the motor can be extremely difficult. The literature provides many methods, some of which are highly elaborate and difficult to implement, to the point that they cannot be applied to ordinary hardware platforms used for motor control applications, which do not have large computational resources.

As an alternative, if instead of using mathematical algorithms one uses so-called pre-calculated or pre-measured look-up tables of machine inductances as a function of the position of the rotor of said machine (synchronous inductances), said tables must be compiled with extreme accuracy, and this in turn is a significant disadvantage, since extremely accurate tables are also very large and therefore occupy considerable memory on the processor. On the other hand, the advantage of these methods is that they allow to obviate the problem of determining the angle 2θ, since it is possible to provide directly the angle θ.

SUMMARY OF THE INVENTION

The aim of the present invention is to provide a method for determining the position of the rotor of a synchronous alternating-current permanent-magnet machine, which allows to determine the position of the rotor with calculations that are simplified with respect to known types of method and therefore with reduced computational resources.

Within the scope of this aim, an object of the present invention is to provide a method for determining the position of the rotor of a synchronous alternating-current permanent-magnet machine that allows to determine the sin(2θ) and cos(2θ) parameters with θ as the electrical angle.

Another object of the present invention is to provide a method for determining the position of the rotor of a synchronous alternating-current permanent-magnet machine that allows to obtain from sin(2θ) and cos(2θ) the pair sin(θ) and cos(θ) that allows to univocally identify the position of the rotor of the machine.

Another object of the present invention is to provide a method for determining the position of the rotor of a synchronous alternating-current permanent-magnet machine that is highly reliable, relatively simple to provide and at competitive costs.

This aim is achieved at least in part, by a method for determining the position of the rotor of a synchronous alternating-current permanent-magnet machine, which includes, among other features injecting a high-frequency voltage into the machine superimposed on the voltage delivered by the machine control system; measuring the current of the motor and extracting a current that is linked to the injected voltage; and obtaining from said injected voltage and from said corresponding current the electrical angle θ suitable to identify the position of the rotor.

Further characteristics and advantages of the invention will become better apparent from the detailed description of preferred embodiments according to the present disclosure.

DESCRIPTION OF THE PREFERRED EMBODIMENTS

The method according to the invention, applied to a synchronous alternating-current permanent-magnet machine, is as follows.

Considering a permanent-magnet anisotropic machine, the method entails writing the equations of the machine in the reference system coupled to the stator of said machine. The equations of the machine are produced by a matrix of the inductances of the machine, in which there is a fixed part and a part that depends on the electrical angle of the machine.

$$Lind = Lfix + Lvar \qquad (\theta)$$

$$Lfix := \begin{pmatrix} Ls0 & -Lm0 & -Lm0 \\ -Lm0 & Ls0 & -Lm0 \\ -Lm0 & -Lm0 & Ls0 \end{pmatrix}$$

-continued $$Lvar(\theta) := \begin{pmatrix} Ls2 \cdot \cos(2 \cdot \theta) & Lm2 \cdot \cos\left(2 \cdot \theta + \frac{2 \cdot \pi}{3}\right) & Lm2 \cdot \cos\left(2 \cdot \theta - \frac{2 \cdot \pi}{3}\right) \\ Lm2 \cdot \cos\left(2 \cdot \theta + \frac{2 \cdot \pi}{3}\right) & Ls2 \cdot \cos\left(2 \cdot \theta - \frac{2\pi}{3}\right) & Lm2 \cdot \cos(2 \cdot \theta) \\ Lm2 \cdot \cos\left(2 \cdot \theta - \frac{2 \cdot \pi}{3}\right) & Lm2 \cdot \cos(2 \cdot \theta) & Ls2 \cdot \cos\left(2 \cdot \theta + \frac{2\pi}{3}\right) \end{pmatrix}$$

where $$Ls2 := Lm2$$

Assuming the simplest case, in which the variation according to the angle is sinusoidal, there is therefore a matrix of inductances that is determined by a fixed part and by a part in which the inductances are linked sinusoidally to the variation of the angle.

At this point it is necessary to define a Park matrix with fixed axes, and the Park transform is applied to the equations mentioned above, written in the reference system coupled to the stator of the machine, so as to describe said equations according to axes $\alpha$ and $\beta$.

$$\text{Park} := \sqrt{\frac{2}{3}} \cdot \begin{pmatrix} 1 & \frac{-1}{2} & \frac{-1}{2} \\ 0 & \frac{\sqrt{3}}{2} & \frac{-\sqrt{3}}{2} \\ \frac{1}{\sqrt{2}} & \frac{1}{\sqrt{2}} & \frac{1}{\sqrt{2}} \end{pmatrix}$$

The Park transform therefore produces the matrix of inductances transformed in the reference system $\alpha$, $\beta$.

$$\begin{pmatrix} Ls0 + Lm0 & 0 & 0 \\ 0 & Ls0 + Lm0 & 0 \\ 0 & 0 & Ls0 - 2 \cdot Lm0 \end{pmatrix} + \begin{pmatrix} \frac{3}{2} \cdot Lm2 \cdot \cos(2 \cdot \theta) & \frac{3}{2} \cdot Lm2 \cdot \sin(2 \cdot \theta) & 0 \\ \frac{3}{2} \cdot Lm2 \cdot \sin(2 \cdot \theta) & \frac{-3}{2} \cdot Lm2 \cdot \cos(2 \cdot \theta) & 0 \\ 0 & 0 & 0 \end{pmatrix} \rightarrow$$

$$\begin{pmatrix} Ls0 + Lm0 + \frac{3}{2} \cdot Lm2 \cdot \cos(2 \cdot \theta) & \frac{3}{2} \cdot Lm2 \cdot \sin(2 \cdot \theta) & 0 \\ \frac{3}{2} \cdot Lm2 \cdot \sin(2 \cdot \theta) & Ls0 + Lm0 - \frac{3}{2} \cdot Lm2 \cdot \cos(2 \cdot \theta) & 0 \\ 0 & 0 & Ls0 - 2 \cdot Lm0 \end{pmatrix}$$

At this point a high-frequency voltage is injected into the motor and, by applying the principle of overlapping effects, it is possible to ignore the effect of the sinusoidal counter-electromotive force in the equations of the machine with fixed axes.

For example, for a 50-Hz machine, the injected high-frequency voltage can be a voltage at 800 Hz, with a switching frequency of 10 kHz, which overlaps the voltage dispensed by the machine control system.

At this point the current of the motor is measured and the current linked to the injected voltage is extracted by filtering.

Essentially, the injected high-frequency voltage can be broken down into the two components along the axes $\alpha$ and $\beta$. The equations of the injected voltage contain the derivative with respect to time of the flux $$v\alpha := R \cdot i\alpha + p\phi\alpha$$

$$v\beta := R \cdot i\beta + p\phi\beta$$

with respect to the axes $\alpha$ and $\beta$, respectively, and therefore by integrating these equations one obtains the fluxes along the axes $\alpha$ and $\beta$, which are given by the product of the matrix of inductances along the axes $\alpha$ and $\beta$ and the current, along the axes $\alpha$ and $\beta$, linked to the injected voltage $$\phi_{\alpha\beta} = \text{Lind}_{\alpha\beta} \cdot i_{\alpha\beta}$$

A system of two equations in the unknowns $\sin(2\theta)$ and $\cos(2\theta)$ is thus obtained.

$$\begin{cases} \phi\alpha - Ls0 - Lm0 = \frac{3}{2} \cdot Lm2 \cdot \sin(2 \cdot \vartheta) \cdot i\beta + \frac{3}{2} \cdot Lm2 \cdot \cos(2 \cdot \vartheta) \cdot i\alpha \\ \phi\beta - Ls0 - Lm0 = \frac{3}{2} \cdot Lm2 \cdot \sin(2 \cdot \vartheta) \cdot i\alpha - \frac{3}{2} \cdot Lm2 \cdot \cos(2 \cdot \vartheta) \cdot i\beta \end{cases}$$

The determinant of the matrix $$\det = -\left(\frac{3}{2} Lm2\right)^2 \left(i_\alpha^2 + i_\beta^2\right)$$

which is constituted by the product of the inductances of the machine, along the axes $\alpha$ and $\beta$, and the injected current along the axes $\alpha$ and $\beta$, linked to the injected voltage, is constantly negative and nonzero if the injected current is not nil.

The system of equations described above therefore allows to obtain $\sin(2\theta)$ and $\cos(2\theta)$.

At this point, the problem is to obtain $\sin(\theta)$ from $\sin(2\theta)$ and $\cos(\theta)$ from $\cos(2\theta)$.

The filtering step performed to measure the current of the motor and thus extract the current linked to the injected voltage can be obtained by implementing a hardware or software filter that is suitable to obtain only the currents produced by the injection of high-frequency voltage, without thereby altering their information content, eliminating the components at the frequency of the fundamental and those derived from high-frequency pulse width modulation.

For example, it is possible to use second-order bandpass filters implemented analogically or digitally in the processor.

It is noted that when the rotor is locked (i.e., the frequency of the fundamental is zero), filtering is practically useless and the results are highly valid.

Therefore, the method described above allows to determine the initial position of the motor, minus a 180° angle, and also allows to control the machine when the rotor is locked (torque control with locked rotor).

Once sin(2θ) and cos(2θ) have been determined, there are two possible solutions for sin(θ) and cos(θ). This means that the position of the rotor is known in terms of orientation, but its orientation is not known, i.e., the magnetic north and south of the rotor are not known.

In order to define the direction of the position of the rotor, when the machine starts it is sufficient to inject a very small voltage for a very short time in the direction of the axis cc, thus obtaining a small movement of the rotor, and then observe the change in position; the north of the rotor tends to align with the axis α, and therefore the variation of sin(2θ) and cos(2θ) that is observed allows to define the direction of the rotor position. From that moment onward, at each step k of the observation algorithm, one chooses from the two possible solutions for sin(θ) and cos(θ) the solution that is closest to the one found in the preceding step, i.e., k−1, while the other solution is spaced by an angle θ which is equal to approximately 180°.

In greater detail, assuming that one has two mutually different values of the angle θ, and assuming that the correct solution of the equations is the first value, for example the north pole is close to the axis α, at 45°, if a positive voltage is applied along the α axis, the cosine of the angle increases, while the sine decreases, because the north pole tends to align with the axis α. If instead the solution is the second one found (i.e., the south pole is close to the axis a, at 45°, and therefore the north pole is at 225°), the cosine of the angle is seen to decrease, while the sine increases because the south pole tends to move away from the axis α.

In practice it has been found that the method according to the invention allows to determine the position of the rotor of a permanent-magnet anisotropic alternating-current machine without using a position sensor for said rotor.

The method according to the invention, moreover, can be implemented with computational resources that are commonly available in ordinary hardware platforms used for motor control.

Furthermore, the method for determining the electrical angle θ, starting from the sine and cosine of the angle 2θ, obtained by means of the method according to the invention, is performed without resorting to pre-calculated tables of machine inductances as a function of rotor position and by using solving algorithms that are extremely simple with respect to known solutions.

I claim:

1. A method for determining a position of a rotor of a synchronous alternating-current permanent-magnet machine, the method comprising:

injecting in the machine a high-frequency voltage superimposed on a voltage delivered by a machine control system;

measuring a current of the motor and extracting a current corresponding to said injected voltage; and obtaining, from said injected voltage and from said corresponding current an electrical angle θ suitable to identify the position of the rotor;

wherein said obtaining from said injected voltage and from said corresponding current the electric angle θ comprises;

determining fluxes of said machine as a function of inductances of said machine, the electrical angle of said rotor, and the current linked to said injected voltage;

obtaining a sine and cosine of twice the electrical angle θ of said machine; and extracting, from said sine and cosine values, a sine and cosine value of the electrical angle θ of said machine.

2. The method of claim 1, wherein said extracting, from said sine and cosine values, a sine and cosine value of the electrical angle θ of said machine comprises:

when said machine starts, injecting a low-value voltage for a short time in a direction of one of the reference axes of said machine, in order to obtain a minimum movement of said rotor; and observing a change in position of the rotor and determining, from a variation of the sine and cosine of twice the electrical angle θ, a direction of the position of the rotor.

* * * * *